US011143512B2

(12) United States Patent
Muto

(10) Patent No.: US 11,143,512 B2
(45) Date of Patent: Oct. 12, 2021

(54) IMAGE DATA GENERATION DEVICE FOR VEHICLE, TRAVEL TRAJECTORY DATA GENERATION SYSTEM, AND STORAGE MEDIUM

(71) Applicant: DENSO CORPORATION, Kariya (JP)

(72) Inventor: Shigehiro Muto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/942,720

(22) Filed: Jul. 29, 2020

(65) Prior Publication Data
US 2020/0355506 A1 Nov. 12, 2020

Related U.S. Application Data

(63) Continuation of application No. PCT/JP2018/044001, filed on Nov. 29, 2018.

(30) Foreign Application Priority Data

Feb. 1, 2018 (JP) .............................. JP2018-016396

(51) Int. Cl.
*G01C 21/30* (2006.01)
*G06K 9/00* (2006.01)
*G06T 7/70* (2017.01)
*H04N 1/00* (2006.01)
*H04N 5/265* (2006.01)
*H04N 7/00* (2011.01)
*G08G 1/09* (2006.01)
*G09B 29/00* (2006.01)
(Continued)

(52) U.S. Cl.
CPC ......... *G01C 21/30* (2013.01); *G06K 9/00798* (2013.01); *G06T 7/74* (2017.01); *H04N 1/00209* (2013.01); *H04N 1/00244* (2013.01); *H04N 5/265* (2013.01); *H04N 7/183* (2013.01); *G06T 2207/30256* (2013.01)

(58) Field of Classification Search
USPC ....................................................... 348/116
See application file for complete search history.

(56) References Cited

U.S. PATENT DOCUMENTS

2012/0050769 A1\* 3/2012 Houjou ................. G06F 3/1236
358/1.9
2017/0008521 A1\* 1/2017 Braunstein ......... G06K 9/00791
2018/0265084 A1 9/2018 Inou et al.

FOREIGN PATENT DOCUMENTS

JP 2007011492 A 1/2007
JP 2007226111 A 9/2007
(Continued)

*Primary Examiner* — Patricia I Young
(74) *Attorney, Agent, or Firm* — Harness, Dickey & Pierce, P.L.C.

(57) ABSTRACT

An image data generation device for a vehicle, communicates with a server that recognizes an image in at least one of a basic map data, an aerial photograph data, and a navigation map data, recognizes an image data generated by an in-vehicle camera, and generates a travelling trajectory data for autonomous driving. The image data generation device for the vehicle includes: a segment image data generation unit that generates an image data for each segment as a segment image data from an image data generated by an in-vehicle camera; and a data transmission unit that transmits the segment image data generated by the segment image data generation unit to the server.

14 Claims, 16 Drawing Sheets

(51) Int. Cl.
  *G09B 29/10* (2006.01)
  *G06T 7/73* (2017.01)
  *H04N 7/18* (2006.01)

(56) References Cited

FOREIGN PATENT DOCUMENTS

| | | | |
|---|---|---|---|
| JP | 2012120088 A | 6/2012 |
| JP | 2014228526 A | 12/2014 |
| JP | 2017078607 A | 4/2017 |
| JP | 2017102827 A | 6/2017 |

* cited by examiner

FIG. 12

| | MAP DATA | | LEFT SIDE BORDER LINE | | RIGHT SIDE BORDER LINE | | IN-VEHICLE RECOGNITION RESULT | | |
|---|---|---|---|---|---|---|---|---|---|
| | ORIENTATION | NUMBER OF ALL LANES | NUMBER OF EXTENDED LANES | TYPE | COLOR | TYPE | COLOR | NUMBER OF ALL LANES | NUMBER OF ADJACENT LEFT SIDE LANES | NUMBER OF ADJACENT RIGHT SIDE LANES |
| LANE 1 | FORWARD DIRECTION | 3 | 0 | SOLID LINE | WHITE | BROKEN LINE | WHITE | 3 | 0 | 2 |
| LANE 2 | FORWARD DIRECTION | 3 | 0 | BROKEN LINE | WHITE | BROKEN LINE | WHITE | 3 | 1 | 1 |
| LANE 3 | FORWARD DIRECTION | 3 | 0 | BROKEN LINE | WHITE | SOLID LINE | WHITE | 3 | 2 | 0 |

IMAGE DATA GENERATION DEVICE FOR VEHICLE, TRAVEL TRAJECTORY DATA GENERATION SYSTEM, AND STORAGE MEDIUM

CROSS REFERENCE TO RELATED APPLICATION

The present application is a continuation application of International Patent Application No. PCT/JP2018/044001 filed on Nov. 29, 2018, which designated the U.S. and claims the benefit of priority from Japanese Patent Application No. 2018-016396 filed on Feb. 1, 2018. The entire disclosures of all of the above applications are incorporated herein by reference.

TECHNICAL FIELD

The present disclosure relates to an image data generation device for a vehicle, a travel trajectory data generation system, and a storage medium.

BACKGROUND

The server provides a configuration for recognizing images of base map data, aerial photograph data, map data for navigation, and the like, and generating traveling trajectory data for autonomous driving. However, in the above configuration for recognizing images of various data, it may be difficult to recognize border lines, for example, in a section under an overpass, a section of a tunnel, a section where a vehicle is parked and/or stopped, so that it may be difficult to generate the traveling trajectory data. Under such circumstances, on the vehicle side, the image data generated by the in-vehicle camera is transmitted to the server. In the server, in addition to the image recognition of the above-described base map data and the like, the image data received from the vehicle side is also processed by an image recognition, and it is conceivable to generate travel trajectory data by complementing the range, in which it is difficult to recognize the border lines from the base map data or the like, with the image data received from the vehicle. For example, in a conceivable configuration, an in-vehicle camera captures an image of the front of a vehicle and generates image data of the front of the vehicle.

SUMMARY

According to an example embodiment, an image data generation device for a vehicle, communicates with a server that recognizes an image in at least one of a basic map data, an aerial photograph data, and a navigation map data, recognizes an image data generated by an in-vehicle camera, and generates a travelling trajectory data for autonomous driving. The image data generation device for the vehicle includes: a segment image data generation unit that generates an image data for each segment as a segment image data from an image data generated by an in-vehicle camera; and a data transmission unit that transmits the segment image data generated by the segment image data generation unit to the server.

BRIEF DESCRIPTION OF THE DRAWINGS

The above and other objects, features and advantages of the present disclosure will become more apparent from the following detailed description made with reference to the accompanying drawings. In the drawings:

FIG. 12 is a diagram showing lane attributes.

DETAILED DESCRIPTION

When the image data generated by the in-vehicle camera is being transmitted to the server as it is, a difficulty may arise such that the data amount to be transmitted to the server may be huge. Further, when a money charging system in which the communication cost depends on the data amount is adopted, another difficulty may arise such that the communication cost may increase according to the huge data amount.

Thus, in view of the above points, an image data generation device for a vehicle, a travel trajectory data generation system, a segment image data generation program, and a storage medium are provided for appropriately transmitting data available for generating the travelling trajectory data for autonomous driving while avoiding various difficulties assumed due to an increase of the data amount by suppressing the data amount transmitted from the vehicle side to a server that generates the travelling trajectory data for autonomous driving.

According to an example embodiment, at least one of the base map data, the aerial photograph data, and the map data for navigation is processed by image recognition, and the image data generated by the in-vehicle camera is processed by image recognition, and the data of results is communicated with a server that generates the travel trajectory data for autonomous driving. The segment image data generating unit generates image data for each segment as segment image data based on the image data generated by the in-vehicle camera. The data transmission unit transmits the segment image data generated by the segment image data generating unit to the server.

Instead of transmitting the image data generated by the in-vehicle camera to the server as it is, the segment image data for each segment is generated from the image data, and the generated segment image data is transmitted to the server. As a result, while suppressing the amount of data transmitted from the vehicle side to the server that generates the travelling trajectory data for autonomous driving, and appropriately avoiding various difficulties assumed due to an increase in the amount of data, it is possible to appropriately transmit data useful for generating the travel trajectory data to the server.

Figure 1:
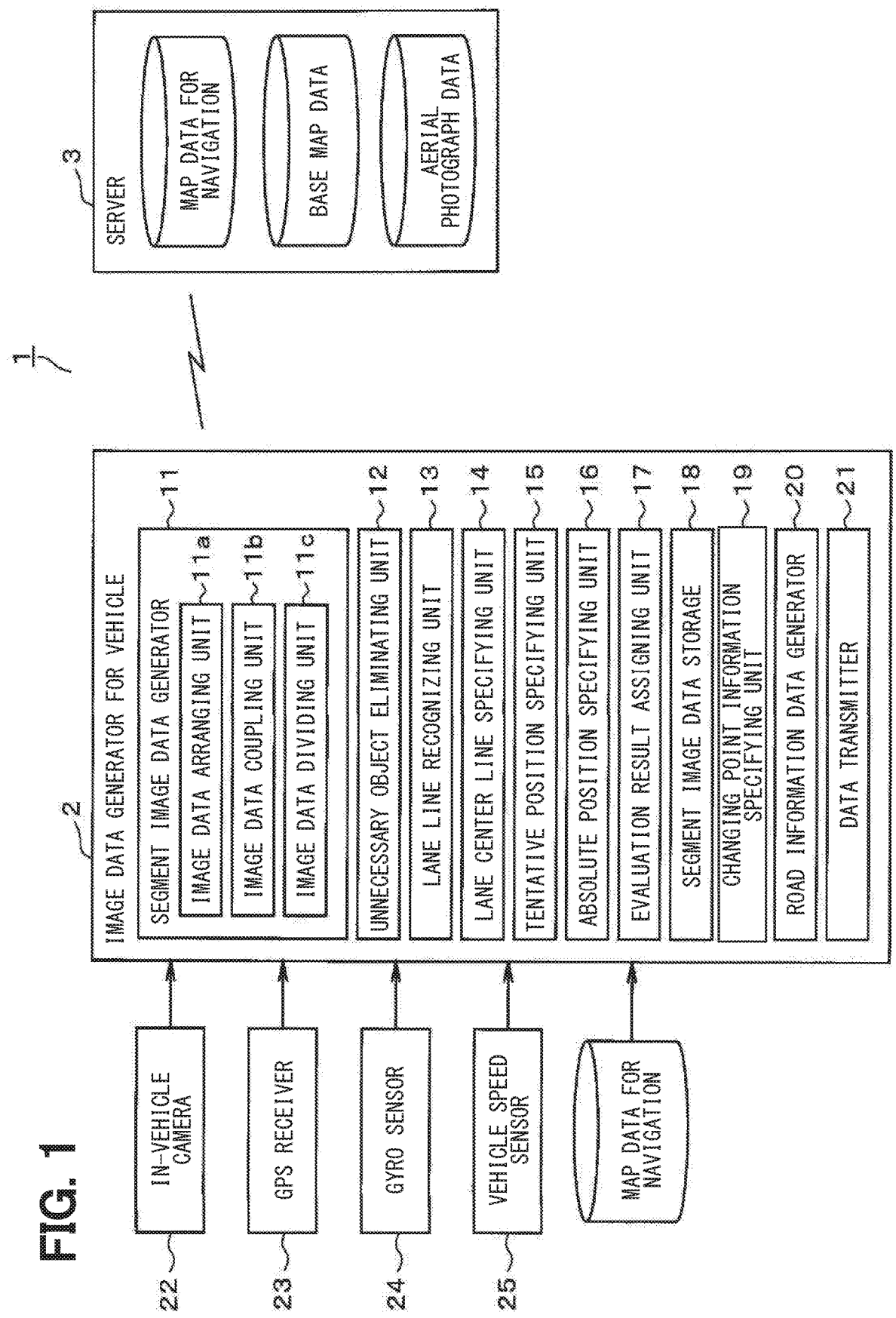
FIG. 1 is a functional block diagram showing an entire configuration of an embodiment.

Hereinafter, an embodiment will be described with reference to the drawings. As shown in FIG. 1, the traveling trajectory data generation system 1 includes a vehicle image data generation device 2 mounted on a vehicle and a server 3, and the vehicle image data generation device 2 and the server 3 communicate data with each other via a communication network. The communication network is, for example, a wide area communication network.

Figure 2:
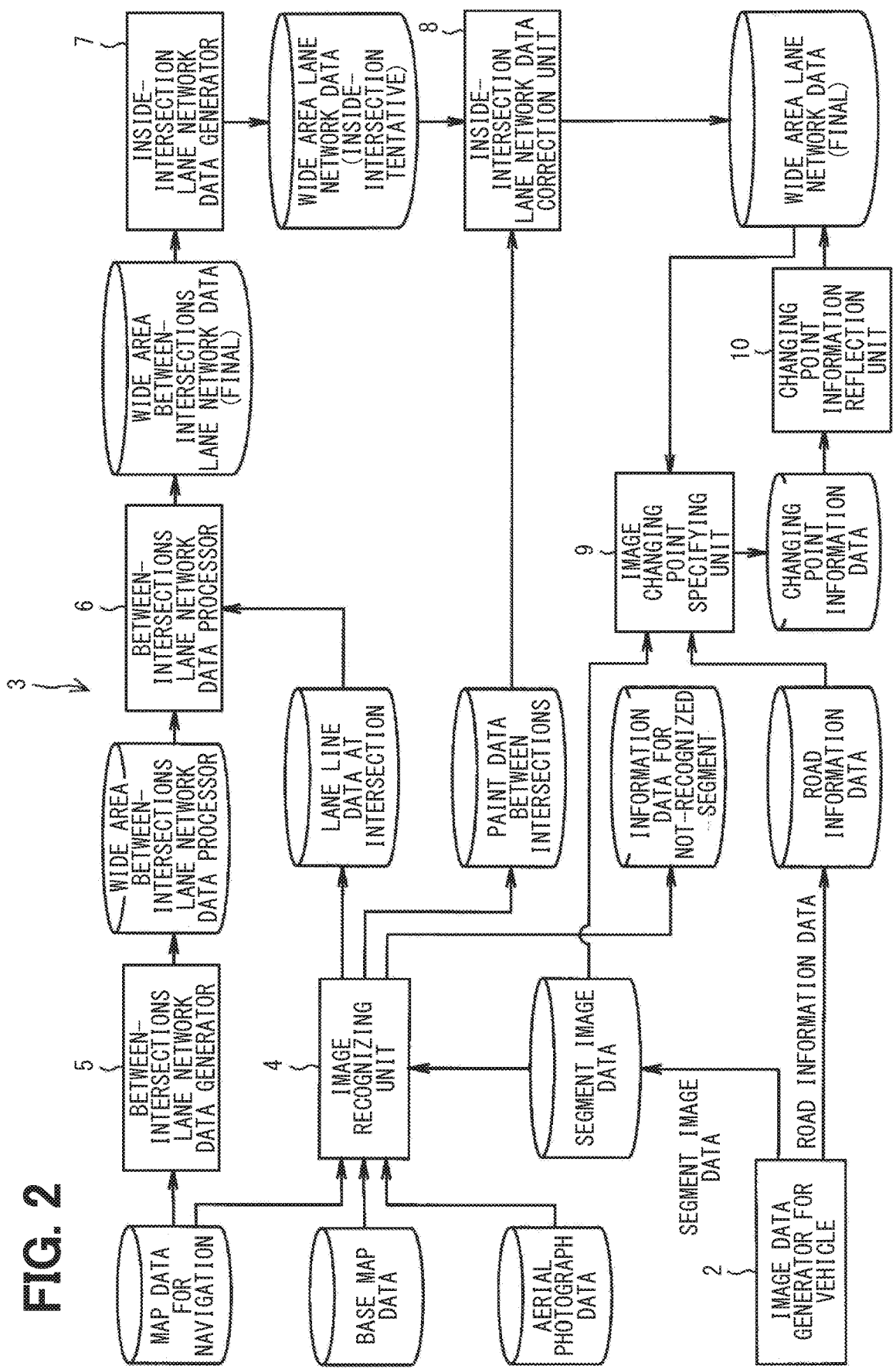
FIG. 2 is a functional block diagram illustrating a configuration of a server.
Figure 3:
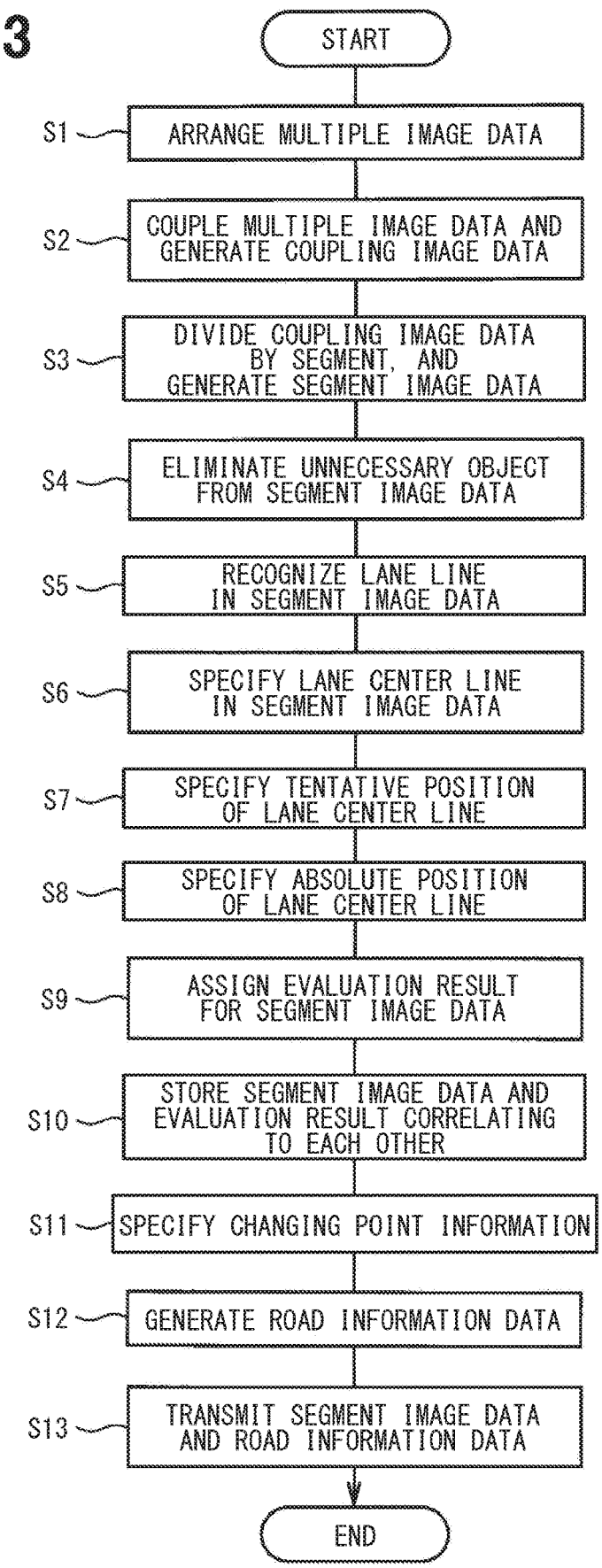
FIG. 3 is a flowchart showing a segment image data generation process.

As shown in FIG. 2, the server 3 performs image recognition on, for example, basic map data provided by the Geographical Survey Institute of Japan, aerial photograph data taken by an aircraft over the sky, navigation map data used for navigation purposes, and the like, and has a function of generating traveling trajectory data for autonomous driving. The server 3 includes an image recognition unit 4, a between-intersections lane network data generating unit 5, an between-intersections lane network data processing unit 6, an inside-intersection lane network data generating unit 7, an inside-intersection lane network data correction unit 8, an image changing point specifying unit 9 and a change point information reflection unit 10.

When the base map data, the aerial photograph data, and the map data for navigation are input, or when the segment image data transmitted from the vehicle is input, the image recognition unit 4 performs image recognition of the input various data, and generates the between-intersections lane line data indicative of the lane line between intersections and an inside-intersection paint data indicative of the paint in the intersection, and further, generates the not-recognized segment information data indicative of the segment in which the recognition is disabled. The not-recognized segment information data is a section under an overpass, a section of a tunnel, a section where vehicles are parked and stopped, and the like, so that it is difficult to recognize a border line in the section.

When inputting the map data for navigation, the between-intersections lane network data generating unit 5 generates wide area between-intersections lane network data for the wide area between intersections based on the input navigation map data. The wide area is, for example, an area for roads nationwide. When inputting the wide area between-intersections lane network data and the between-intersections lane line data into the between-intersections lane network data processing unit 6, the unit 6 adjusts the position in the wide area between-intersections lane network data and sets the attributes of the wide area between-intersections lane network data, so that the unit 6 generates the final version of the wide area between-intersections lane network data. The attributes are the line type and color of the border line, for example.

When inputting the finalized version of the wide area between-intersections lane network data into the inside-intersection lane network data generating unit 7, the unit 7 generates the wide area lane network data with data of the inside of the intersection as a tentative data using the method of a machine learning model or the like based on the input finalized version of the wide area between-intersections lane network data. When inputting the wide area lane network data with data of the inside of the intersection as a tentative data and the inside-intersection paint data into the inside-intersection lane network data correction unit 8, the unit 8 corrects the lane network data of the inside of the intersection according to various input data, and generates the final version of the wide area lane network data for the wide area between intersections and the inside of the intersection as an object.

When inputting the segment image data, the final version of the wide area lane network data, and the road information data, the image changing point specifying unit 9 specifies a changing point of a segment, changing from a previous segment image data of the same segment, as changing point information according to various input data, and generates the changing point information data. When inputting the changing point information data, the changing point information reflection unit 10 reflects the input changing point information data on the final version of the wide area lane network data.

The vehicle image data generation device 2 includes a segment image data generating unit 11, an unnecessary object eliminating unit 12, a lane line recognizing unit 13, a lane center line specifying unit 14, a tentative position specifying unit 15, an absolute position specifying unit 16, an evaluation result assigning unit 17, a segment image data storage unit 18, a change point information specifying unit 19, a road information data generating unit 20, and a data transmission unit 21. These functional blocks are provided by a microcomputer having a CPU (Central Process Unit), a ROM (Read Only Memory), a RAM (Random Access Memory), and an I-O (Input-Output) device. The microcomputer executes a process corresponding to the computer program by performing the computer program stored in the non-transitory tangible storage medium, and controls the overall operations of the vehicular image data generation device 2. The computer programs executed by the microcomputer include a segment image data generation program.

The in-vehicle camera 22 is mounted on the vehicle so as to photograph a range including a road surface in front of the vehicle, generates an image data by photographing a range including the road surface in front of the vehicle, and transmits the generated image data to the vehicular image data generation device 2. The GPS (i.e., Global Positioning System) receiver 23 receives GPS signals transmitted from a plurality of GPS satellites orbiting the earth, calculates parameters stored in the received GPS signals, specifies the GPS trajectory of the vehicle, and outputs the specified GPS trajectory to the vehicular image data generation device 2. The GPS trajectory is an absolute trajectory indicating an absolute trajectory. The gyro sensor 24 calculates the posture of the vehicle body from the angular velocity acting on the vehicle body to specify the estimated trajectory of the vehicle, and outputs the specified estimated trajectory of the vehicle to the vehicle image data generation device 2. The vehicle speed sensor 22 specifies the vehicle speed from the vehicle speed pulse, and outputs the specified vehicle speed to the vehicle image data generation device 2.

The vehicle image data generation device 2 generates an image data for each segment as a segment image data using image data input from the in-vehicle camera 22, GPS trajectory of the vehicle input from the GPS receiver 23, estimated trajectory of the vehicle input from the gyro sensor 24, vehicle speed input from the vehicle speed sensor 25, and map data for navigation. The device 2 further transmits the generated segment image data to the server 3.

The segment image data generating unit 11 has an image data arranging unit 11a, an image data coupling unit 11b, and an image data dividing unit 11c. The image data arranging unit 11a arranges a plurality of image data generated in chronological order by the in-vehicle camera 22 according to the coordinate points of the estimated trajectory of the vehicle. The image data coupling unit 11b couples the plurality of image data arranged by the image data arranging unit 11a in accordance with the paint on the road surface to generate the coupled image data. The image data dividing unit 11c divides the coupled image data generated by the image data coupling unit 11b by each segment according to the road surface paint or navigation map data to generate segment image data.

The unnecessary object eliminating unit 12 adjusts the brightness of a shadow in the segment image data generated by the segment image data generating unit 11, and eliminates unnecessary objects in the segment image data. The lane line recognizing unit 13 recognizes a lane line in the segment image data generated by the segment image data generating unit 11.

The lane center line specifying unit 14 specifies the lane center line in the segment image data from the recognition result of the lane line by the lane line recognizing unit 13. The tentative position specifying unit 15 specifies the traveling direction of the vehicle using the GPS trajectory of the vehicle, compares the traveling direction of the vehicle with at least one of the road center line in the navigation map data and the traveling trajectory of the vehicle, and specifies the tentative position of the lane center line in the segment image data specified by the center line specifying unit 14. The absolute position specifying unit 16 compares the navigation map data with the recognition result of the lane line by the lane line recognizing unit 13, and specifies the absolute position of the lane center line in the segment image data whose tentative position has been specified.

The evaluation result assigning unit 17 assigns an evaluation result to the segment image data generated by the segment image data generating unit 11. The evaluation result is an index generated by digitizing, for example, the brightness of the image, the dust removal rate in the segment image data, the lane line recognition rate, and the like. The higher the numerical value of the index, the higher the evaluation result, and the lower the numerical value of the index, the lower the evaluation result. The segment image data storage unit 18 stores the segment image data generated by the segment image data generating unit 11 and the evaluation result assigned by the evaluation result assigning unit 17 with respect to the segment image data in association with each other.

The changing point information specifying unit 19 specifies, as changing point information, a changing point of the segment image data generated by the segment image data generating unit 11 different from the previous segment image data of the same segment. The changing point information is an increase or a decrease in the number of lanes, a change of the paint on the road surface, or the like.

The road information data generating unit 20 generates road information data from the image data generated by the in-vehicle camera 22, and connects the generated road information data with the segment image data. The road information data is information of the objects on the road in the segment image data, and includes coordinate positions of pavement markings such as a pedestrian crosswalk, a stop line, and a diamond figure at an intersection center, a relative position of a road sign and a traffic light from a lane center line and a height thereof from the road surface.

The data transmitting unit 21 transmits the segment image data stored in the segment image data storage unit 18 to the server 3. When transmitting the segment image data to the server 3, the data transmitting unit 21 transmits the recognition result of the lane line in the segment image data recognized by the lane line recognition unit 13, the absolute position of the lane center line in the segment image data specified by the absolute position specifying unit 16, the evaluation result assigned by the evaluation result assigning unit 17, and the changing point information specified by the changing point information specifying unit 19 to the server 3. Further, the data transmission unit 21 transmits the road information data generated by the road information data generating unit 20 to the server 3.

Next, the operation of the configuration described above will be described with reference to FIGS. 3 to 16.

Figure 4:
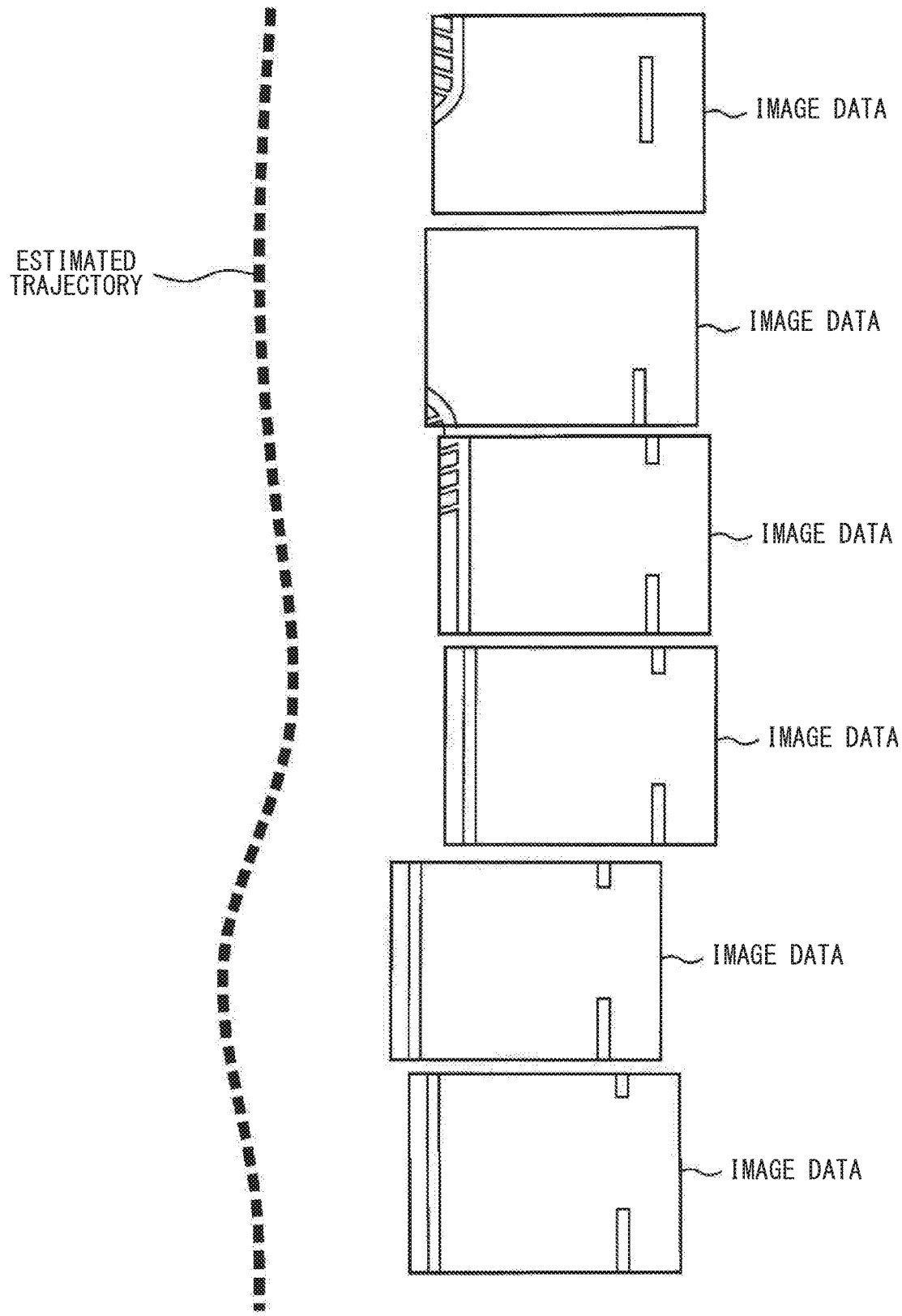
FIG. 4 is a diagram showing image data.

The vehicular image data generating device 2 executes a segment image data generation process by executing a segment image data generation program. When the activation event of the segment image data generation process is established, the vehicular image data generation device 2 starts the segment image data generation process, and arranges a plurality of image data generated in a chronological order by the in-vehicle camera 22 according to the coordinate points of the estimated trajectory of the vehicle (at S1). As shown in FIG. 4, the vehicular image data generation device 2 arranges a plurality of image data obtained by performing an ortho-transform on the image data generated by the in-vehicle camera 22 at regular time intervals in accordance with the coordinate points of the estimated trajectory of the vehicle. In this case, the vehicular image data generation device 2 arranges a plurality of image data with setting the traveling direction of the vehicle, for example, upward.

Figure 5:
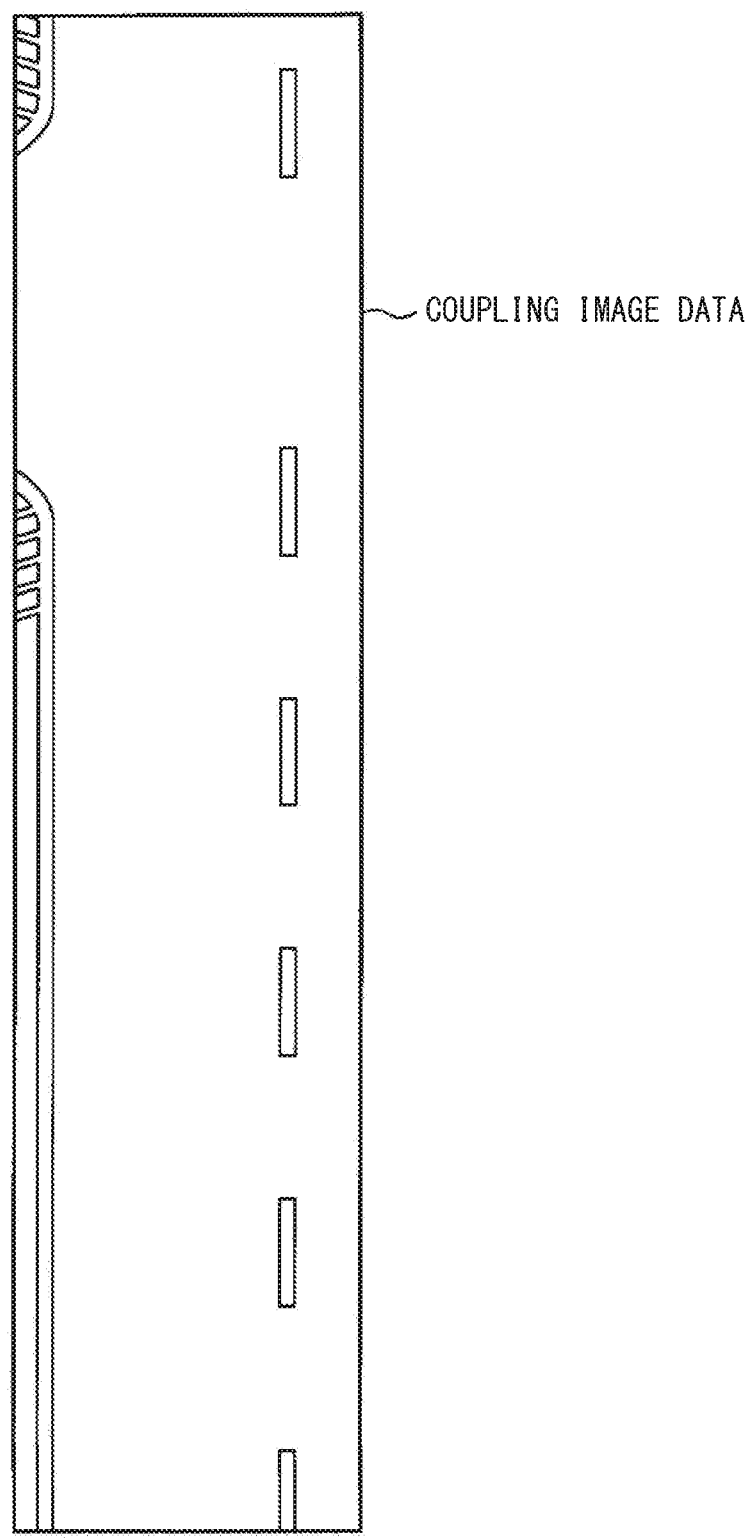
FIG. 5 is a diagram showing coupling image data.

Next, the vehicular image data generation device 2 couples the plurality of arranged image data according to the road surface paint, and generates coupling image data (at S2). As shown in FIG. 5, the vehicular image data generation device 2 couples a plurality of image data so that, for example, solid lane lines and broken lane lines are aligned, and generates coupling image data. Note that the vehicular image data generation device 2 may generate the coupling image data by connecting a plurality of image data in accordance with a road surface paint index other than the lane line.

Figure 6:
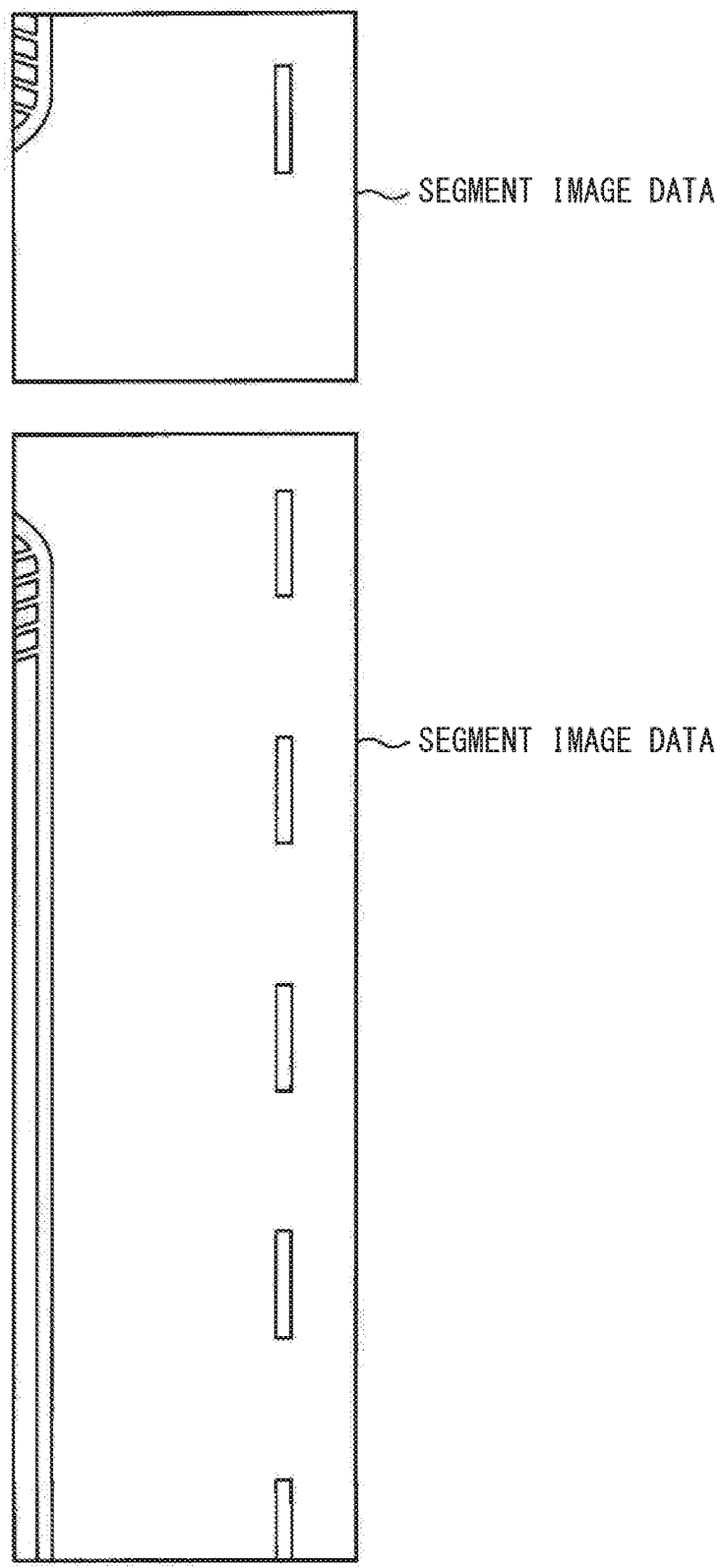
FIG. 6 is a diagram showing segment image data.

Next, the vehicular image data generation device 2 divides the generated coupling image data by each segment according to the road surface paint or the navigation map data to generate the segment image data (at S3). As shown in FIG. 6, the vehicular image data generation device 2 divides the coupling image data into by each segment based on, for example, information on a gap in a lane line, a node position in the navigation map data, and a lane change, and generates the segment image data. Note that the vehicular image data generation device 2 may generate the segment image data by dividing the coupling image data by each segment according to the index of the road surface paint other than the lane line gap. Steps S1 to S3 correspond to a segment image data generation procedure.

Figure 7:
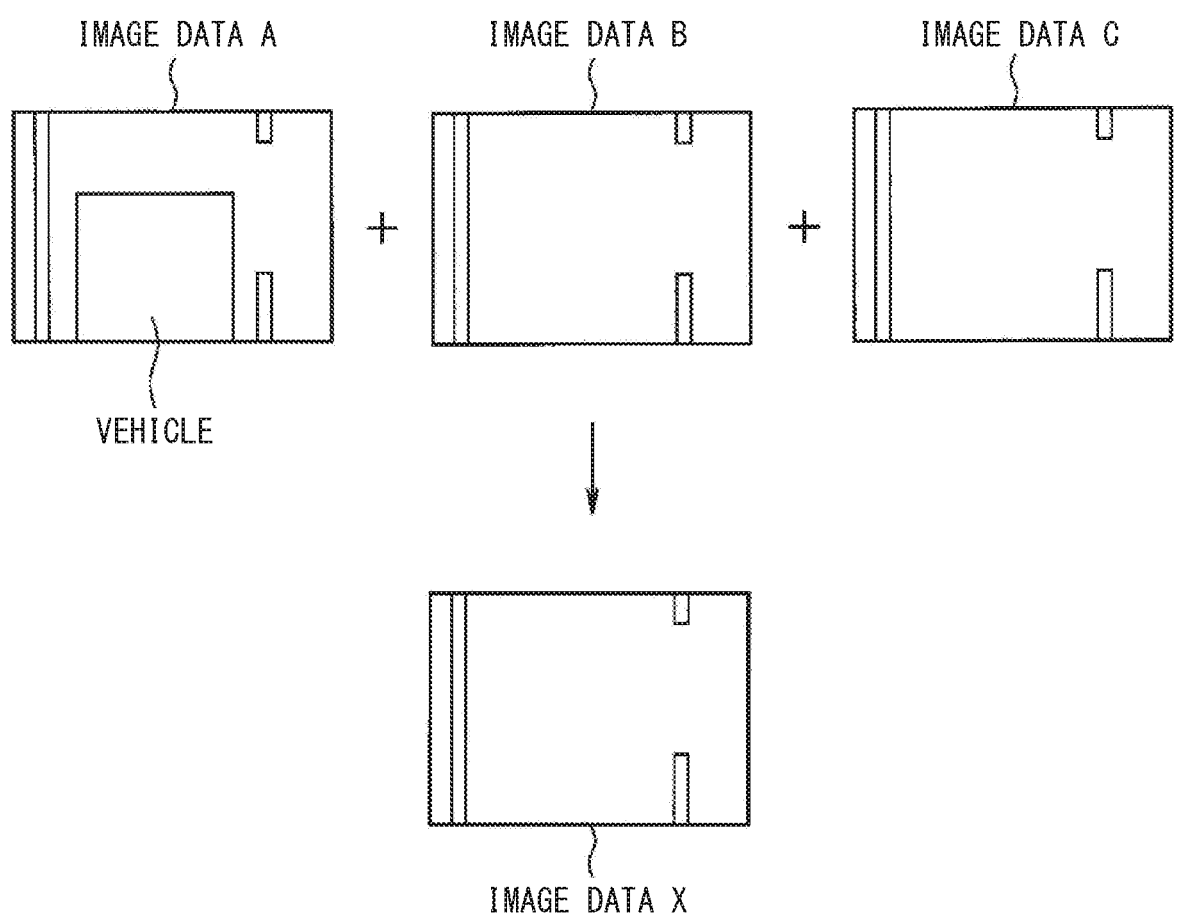
FIG. 7 is a diagram illustrating a mode of eliminating an unnecessary object from segment image data.

Next, the vehicular image data generation device 2 adjusts the brightness of the shadow in the generated segment image data and eliminates unnecessary objects from the segment image data (at S4). As shown in FIG. 7, for example, when there is a vehicle parked and/or stopped in the segment image data A, the vehicular image data generation device 2 generates a plurality of segment image data B and C in the same segment as the segment image data A, and performs the image processing by overlapping the segment image data A to C, thereby eliminating the vehicle of the segment image data A and generating the segment image data X from which the vehicle has been eliminated.

Figure 8:
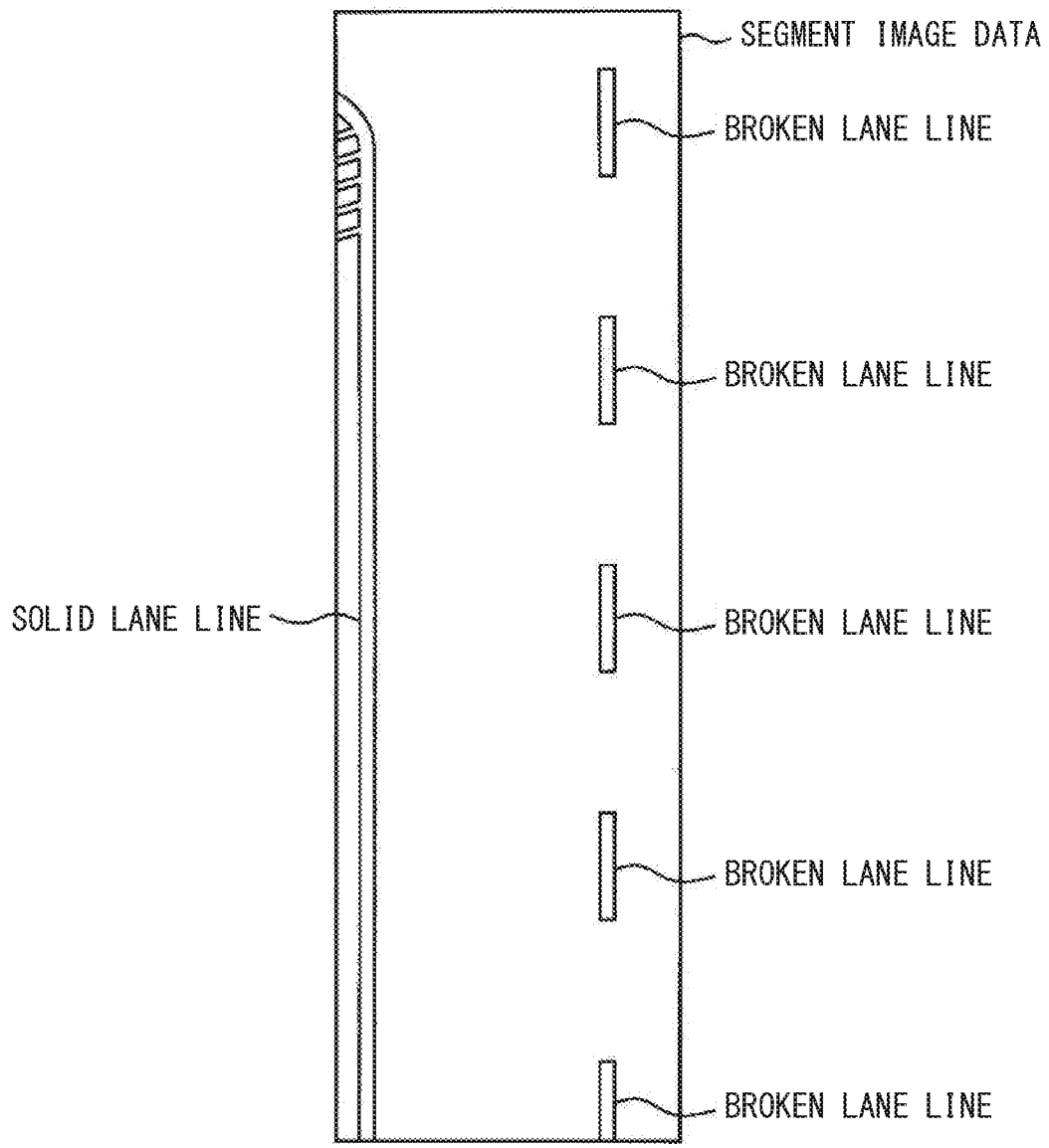
FIG. 8 is a diagram illustrating a mode of recognizing a lane line in segment image data.

Next, the vehicular image data generation device 2 recognizes a lane line in the generated segment image data (at S5). As shown in FIG. 8, for example, the vehicular image data generation device 2 recognizes that the border line on the right side with respect to the traveling direction of the vehicle is a broken lane line and that the border line on the left side is a solid lane line.

Figure 9:
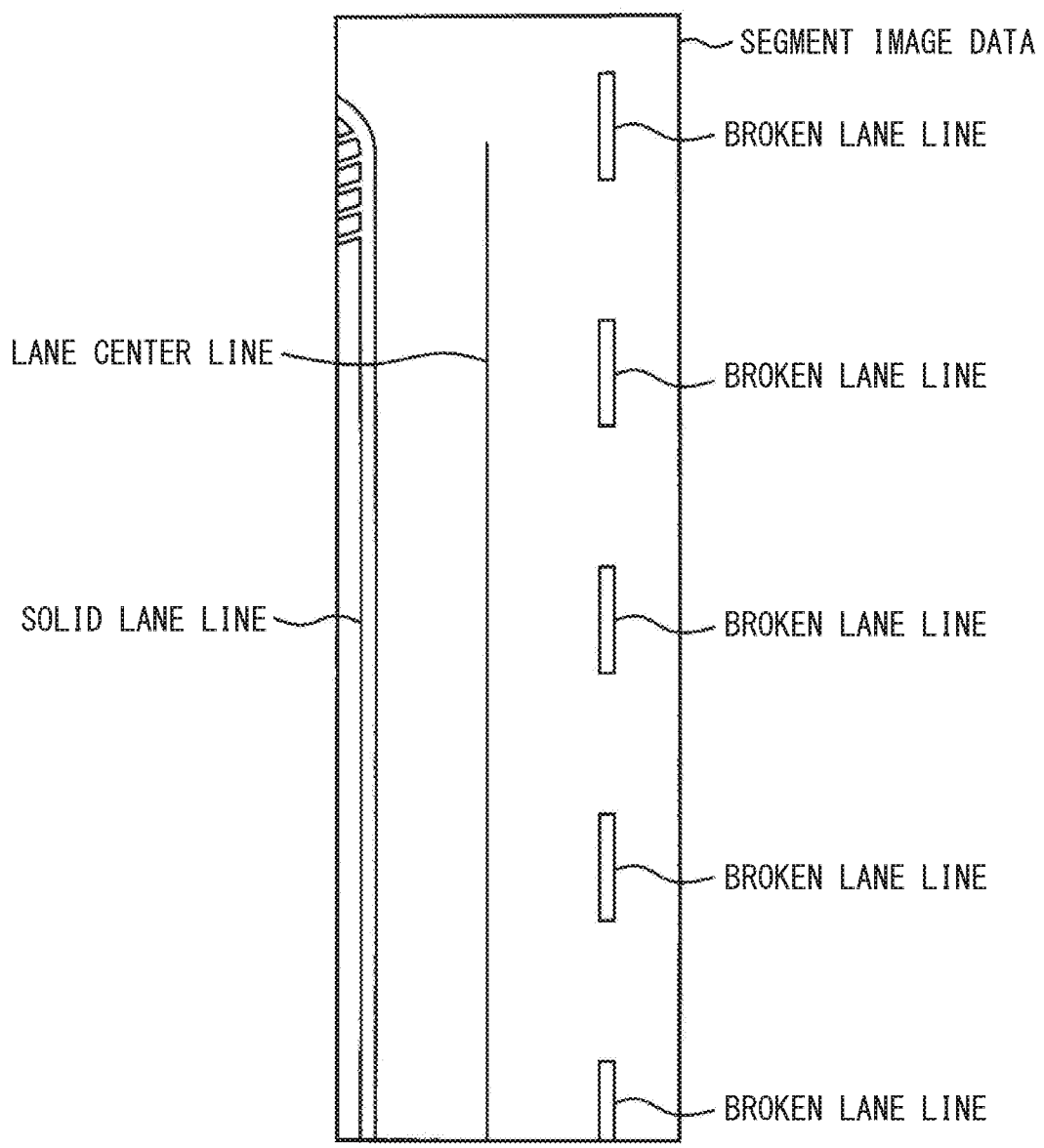
FIG. 9 is a diagram illustrating a mode of specifying a lane center line in segment image data.

Next, the vehicular image data generation device 2 specifies the lane center line in the segment image data based on the recognition result of the lane line in the segment image data (at S6). As shown in FIG. 9, the vehicular image data generation device 2 specifies the lane center line at an intermediate position between the broken lane line and the solid lane line in the segment image data.

Figure 10:
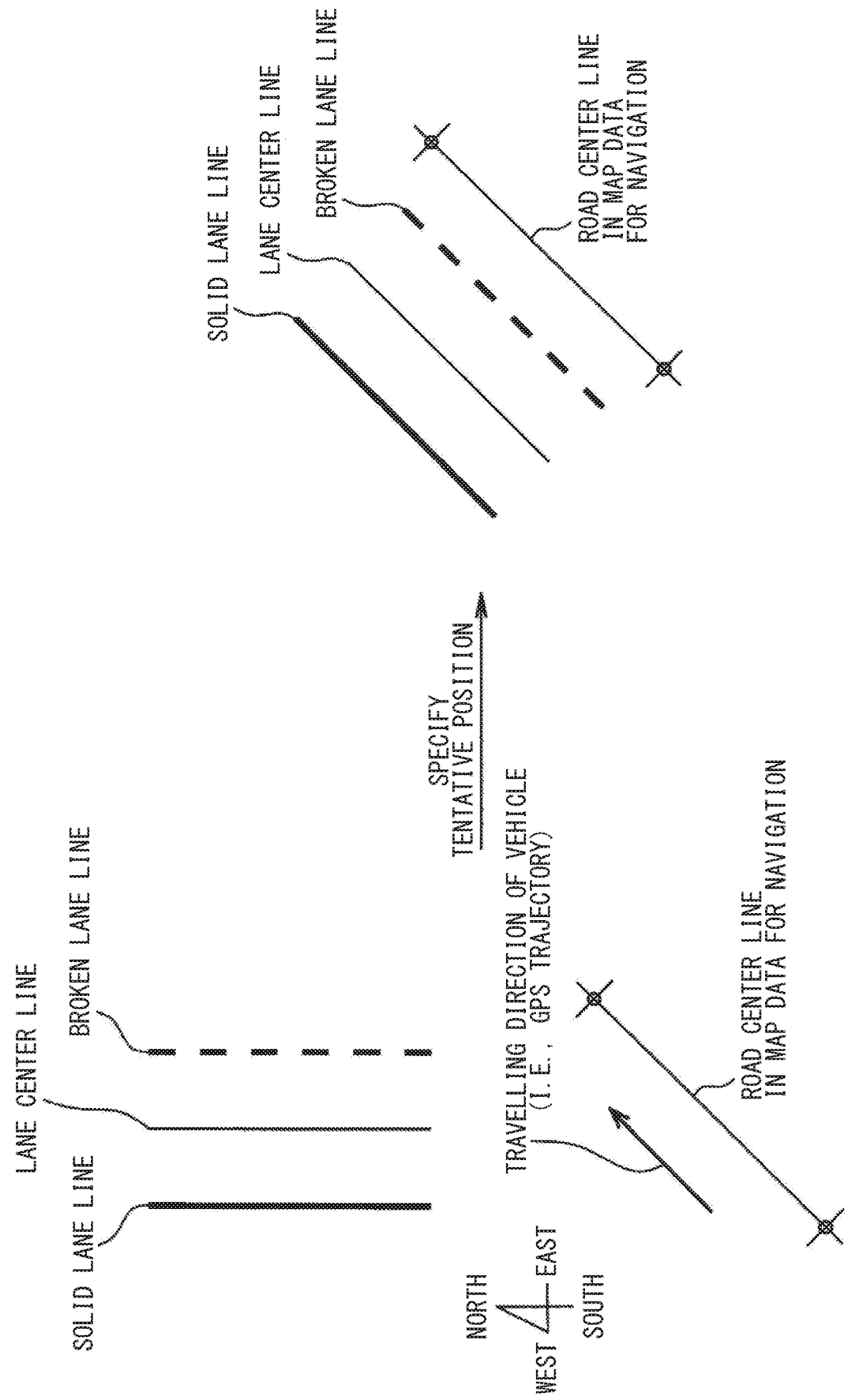
FIG. 10 is a diagram illustrating a mode of specifying a tentative position of a lane center line.

Next, the vehicular image data generation device 2 specifies the traveling direction of the vehicle using the GPS trajectory of the vehicle, and compares at least one of the road center line and the traveling trajectory of the vehicle in the navigation map data with the traveling direction of the vehicle, so that the tentative position of the lane center line in the specified segment image data is determined (at S7). As shown in FIG. 10, the vehicular image data generation device 2 determines the tentative position of the lane center line so that the road center line is assigned to the right side with respect to the traveling direction of the vehicle when a left-hand traffic system is implemented in an area. For example, when the road center line of the navigation map data is set to connect the northeast and southwest directions, the vehicular image data generation device 2 determines the tentative position of the lane centerline to connect the northeast and southwest directions similarly. The vehicular image data generation device 2 determines the tentative position of the lane center line so that the road center line is assigned to the left side with respect to the traveling direction of the vehicle when a right-hand traffic system is implemented in an area.

Figure 11:
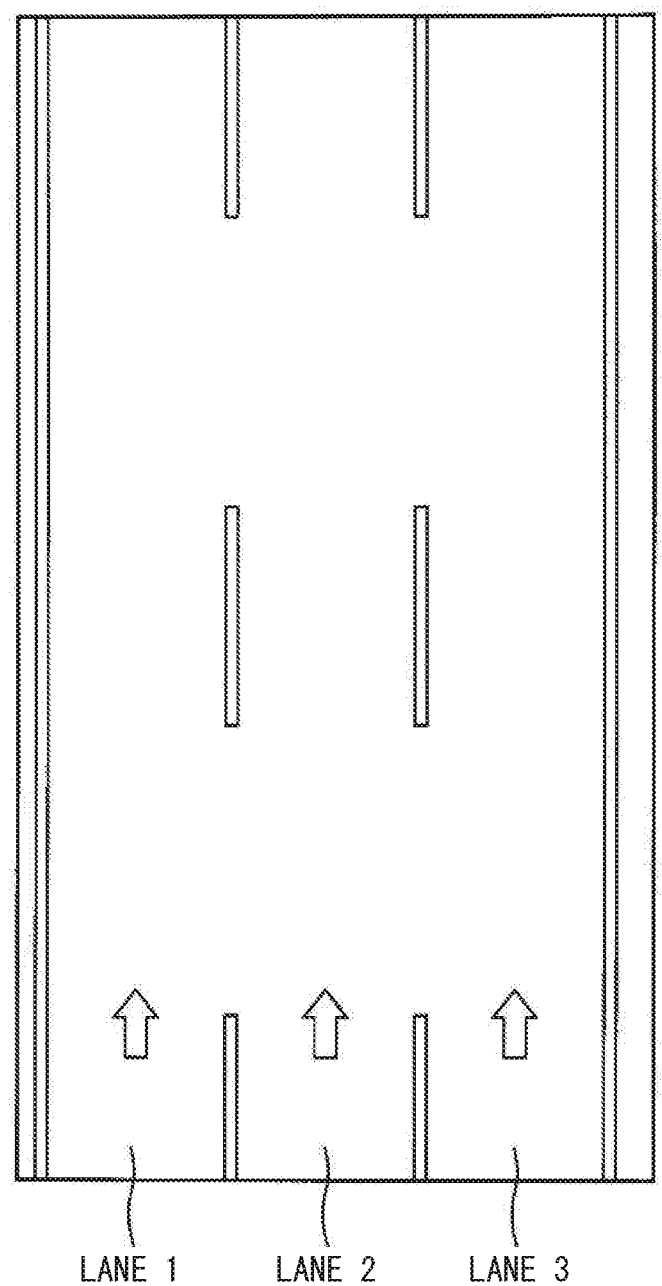
FIG. 11 is a diagram showing a three-lane road.
Figure 13:
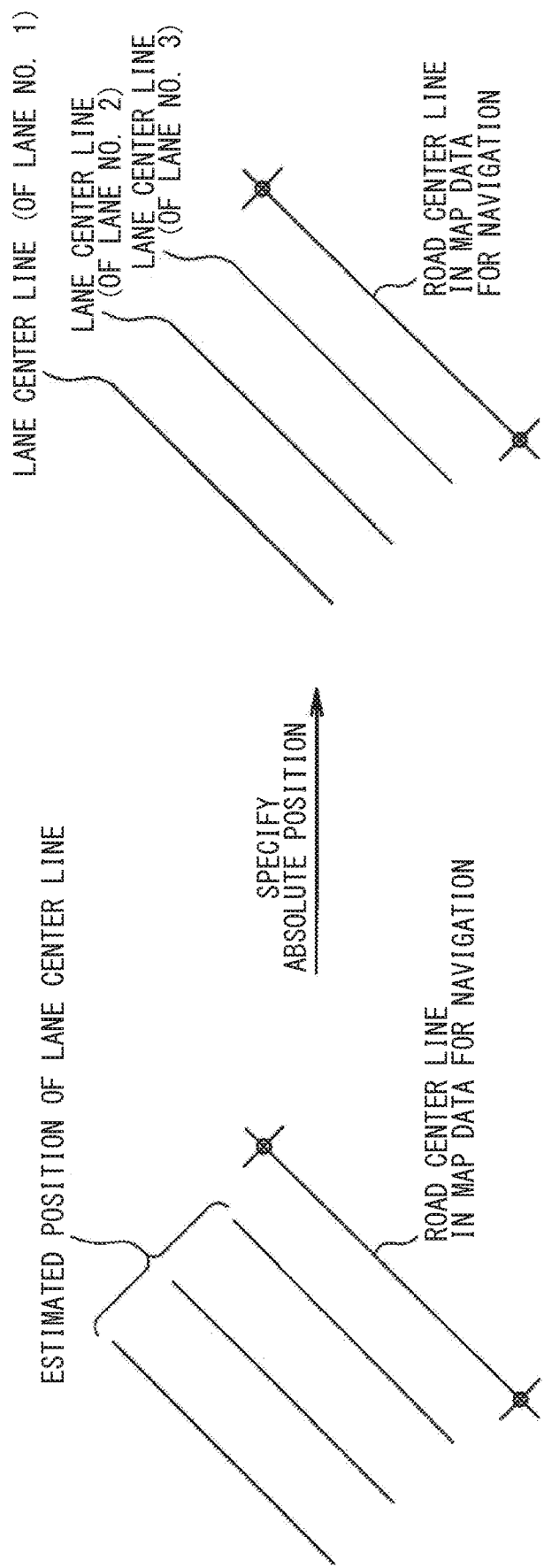
FIG. 13 is a diagram illustrating a mode of specifying an absolute position of a lane center line.

Next, the vehicular image data generation device 2 compares the navigation map data with the recognition result of the lane line by the lane line recognition unit 13 and specifies the absolute position of the lane center line in the segment image data whose tentative position is specified (at S8). As shown in FIGS. 11 to 13, for example, on a three-lane road, when the attribute of each lane is defined, the vehicular image data generation device 2 according to the defined attribute. That is, the vehicular image data generation device 2 determines that the total number of lanes is "3" from the navigation map data, and the border line on the left side is a "solid lane line" and the border line on the right side is a "broken lane line". In this case, the absolute position of the lane center line is specified within "lane No. 1" which is the left lane of the three lanes. Similarly, the vehicular image data generation device 2 determines that the total number of lanes is "3" from the navigation map data, and the border line on the left side is a "broken lane line" and the border line on the right side is a "broken lane line". In this case, the absolute position of the lane center line is specified within "lane No. 2" which is the center lane of the three lanes. Further, the vehicular image data generation device 2 determines that the total number of lanes is "3" from the navigation map data, and the border line on the left side is a "broken lane line" and the border line on the right side is a "solid lane line". In this case, the absolute position of the lane center line is specified within "lane No. 3" which is the right lane of the three lanes.

Next, the vehicular image data generation device 2 assigns an evaluation result to the generated segment image data (at S9), and connects and stores the generated segment image data with the assigned evaluation result (at S10). When the segment image data of the same segment as the segment image data to be stored has already been stored, the vehicular image data generation device 2 compares the evaluation result assigned to the segment image data to be saved with the evaluation result assigned to the segment image data that has already been stored, and stores only the one with the higher evaluation result.

Figure 14:
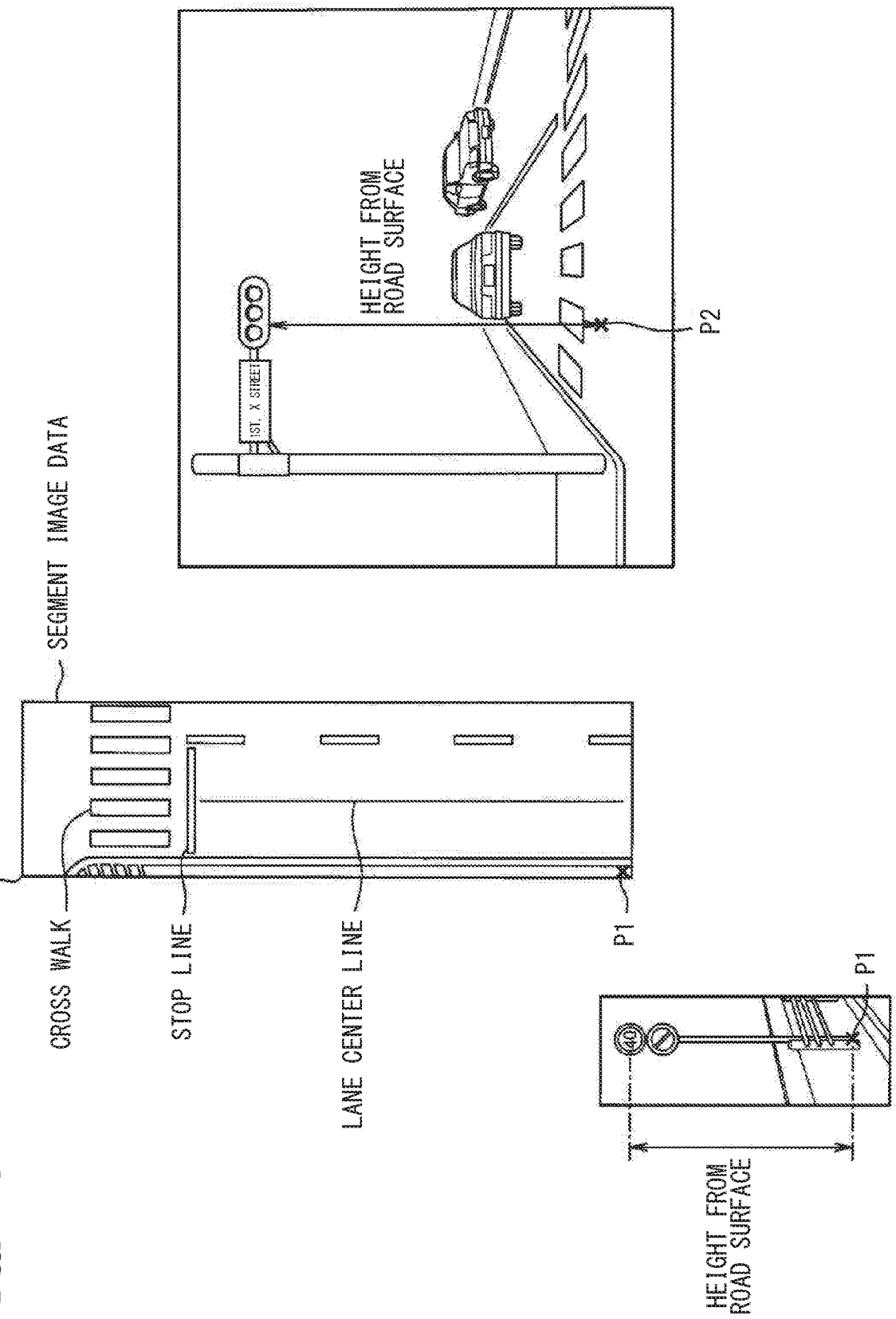
FIG. 14 is a diagram showing road information data.

Next, the vehicular image data generation device 2 specifies, as the changing point information, a changing point of the segment image data from the previous segment image data of the same segment (at S11). Next, the vehicular image data generation device 2 generates road information data from the image data generated by the in-vehicle camera 22, and associates the generated road information data with the segment image data (at S12). As shown in FIG. 14, the vehicular image data generation device 2 generates, as the road information data, the coordinate position of the pedestrian crosswalk, the stop line and the like, the relative position of the road sign, the traffic light and the like from the lane center line, and the height thereof from the road surface in the segment image data. Further, the device 2 connects the generated road information data with the segment image data. In the example of FIG. 14, the vehicular image data generation device 2 sets, for example, the upper left edge point of the segment image data as the reference coordinates of (0, 0), and specifies the coordinate position, indicating the range where the pedestrian crosswalk and the stop line are painted, as the road information. Further, the vehicular image data generation device 2, for example, specifies the relative position indicating the point (i.e., P1) where the road sign with the speed limit of 40 km stands from the lane center line and the height of the road sign from the road surface as road information data. In the example of FIG. 14, the case where the point (P1) of the road sign with the speed limit of 40 km exists in the segment image data. Alternatively, when the point (P2) of the traffic signal exists in the segment image data, the vehicular image data generation device 2 specifies the relative position, indicating the point (P2) where the traffic light stands, from the lane center line and the height of the traffic light from the road surface as the road information data.

Then, the vehicular image data generation device 2 transmits the stored segment image data to the server 3 (at S13, corresponding to a segment image data transmission procedure). At this time, the vehicular image data generation device 2 transmits to the server 3, in addition to the segment image data, the recognition result of the lane line in the segment image data recognized by the lane line recognition unit 13, the absolute position of the lane center line in the segment image data specified by the absolute position specifying unit 16, the evaluation result assigned by the evaluation result assigning unit 17, and the changing point information specified by the changing point information specifying unit 19.

Figure 15:
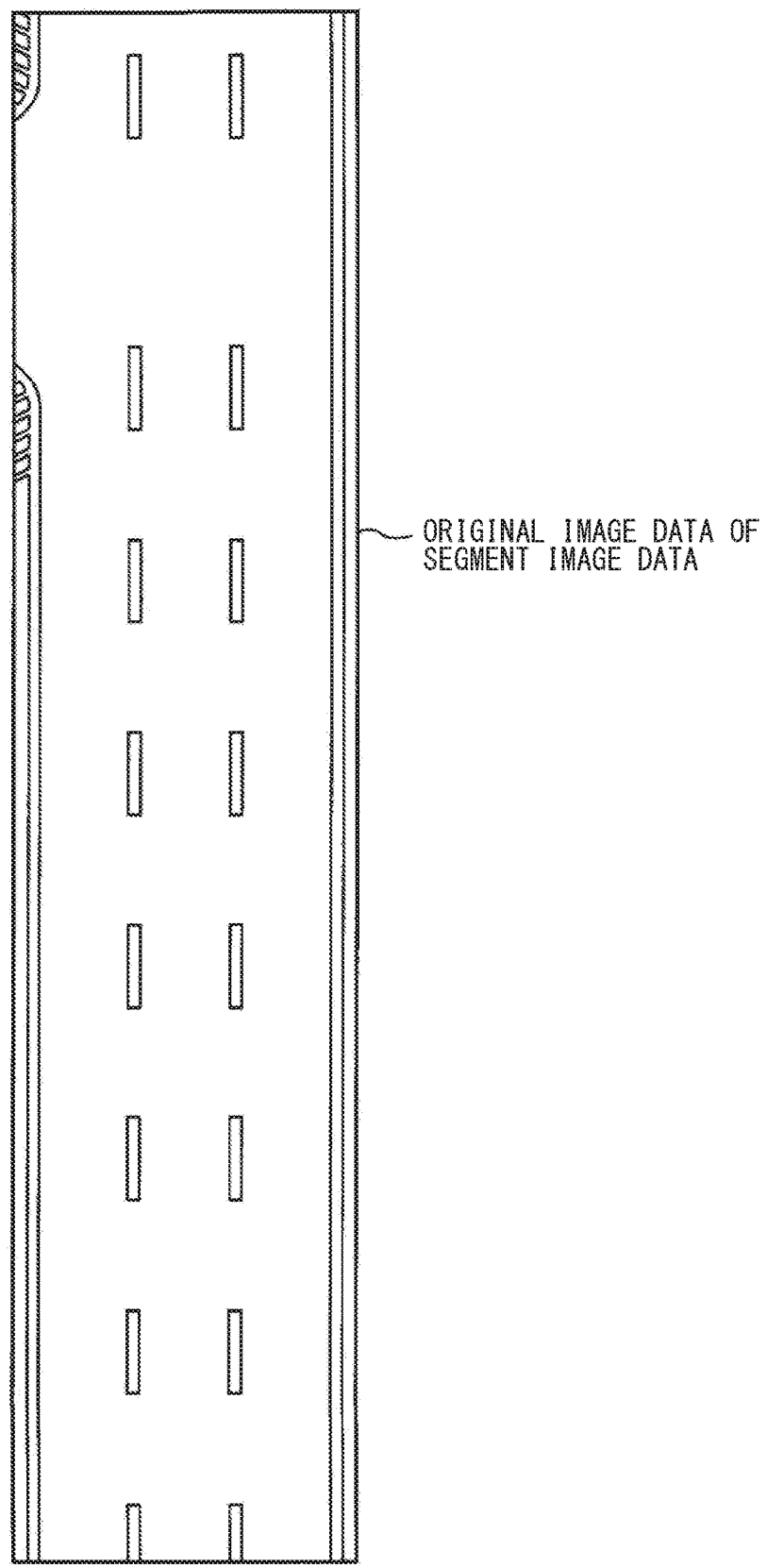
FIG. 15 is a diagram showing original image data as a source of segment image data.
Figure 16:
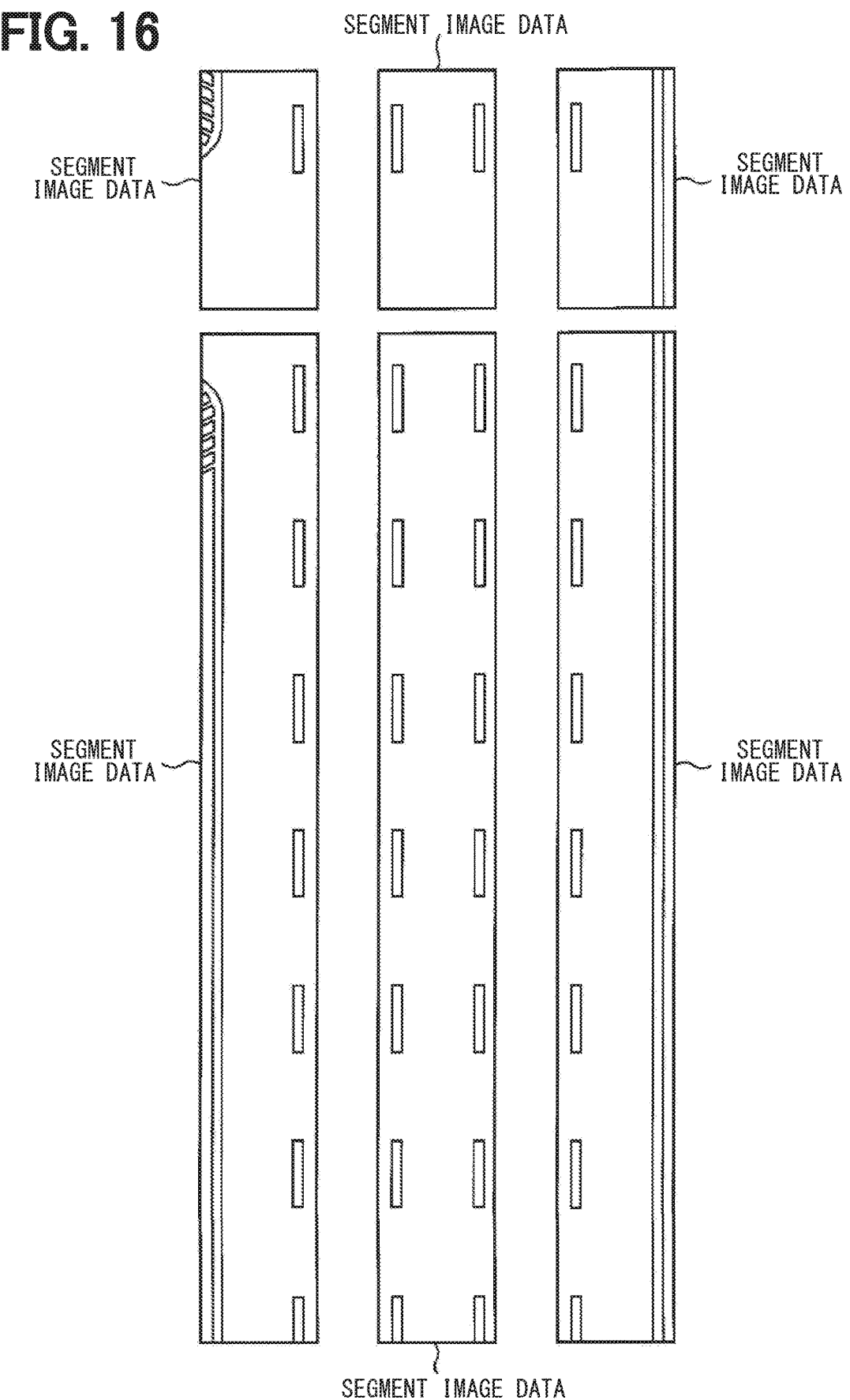
FIG. 16 is a diagram showing segment image data.

Although the left lane of the three lanes has been described above as the unit of the segment image data, the unit of the segment image data may be any unit. That is, as shown in FIGS. 15 and 16, the center lane or the right lane of the three lanes may be used, or the lanes in the intersections may be used.

The embodiment described above may provide effects as below.

In the vehicular image data generation device 2, instead of transmitting the image data generated by the in-vehicle camera 22 to the server 3 as it is, the segment image data for each segment is generated from the image data, and the generated segment image data is transmitted to the server 3. As a result, while suppressing the amount of data transmitted from the vehicle side to the server that generates the travelling trajectory data for autonomous driving, and appropriately avoiding various difficulties assumed due to an increase in the amount of data, it is possible to appropriately transmit data useful for generating the travel trajectory data for autonomous driving to the server.

That is, the server 3 recognizes not only the base map data, the aerial photograph data, and the navigation map data, but also recognizes images of the segment image data received from the vehicular image data generation device 2, it is possible to generate travel trajectory data by supplementing the range, in which it is difficult to recognize lane markings based on the base map data and the like, with the segment image data received from the vehicle side, and appropriately generate travel trajectory data for autonomous driving.

Further, the brightness of the shadow in the segment image data is adjusted to remove unnecessary objects in the segment image data. As a result, the segment image data from which the unnecessary objects have been removed can be transmitted to the server 3, and the load on the server 3 can be reduced without burdening the process of removing the unnecessary object at the server 3.

Further, when the lane line in the segment image data is recognized and the segment image data is transmitted to the server 3, the recognition result of the lane line in the segment image data is transmitted to the server 3. Thereby, the recognition result of the lane line in the segment image data can be transmitted to the server 3, and the process of recognizing the lane line in the segment image data is not burdened on the server 3, and the load on the server 3 is reduced.

Also, when the lane center line in the segment image data is specified, the tentative position of the lane center line is specified, the absolute position of the lane center line is specified, and the segment image data is transmitted to the server 3, the absolute position of the lane center line in the segment image data is transmitted to the server 3. Thereby, the absolute position of the lane center line in the segment image data can be transmitted to the server 3, and the process for specifying the lane center line in the segment image data, the process for specifying the tentative position of the lane center line, and the process for specifying the absolute position of the lane center line are not burdened to the server 3, so that it is possible to reduce the load on the server 3.

In addition, the evaluation result is added to the segment image data, and when the segment image data is transmitted to the server 3, the evaluation result is transmitted to the server 3. As a result, the evaluation result can be transmitted to the server 3, and the load on the server 3 can be reduced without burdening the server 3 with the process of assigning the evaluation result to the section image data.

Further, when the changing point information is specified and the segment image data is transmitted to the server 3, the changing point information is transmitted to the server 3. As a result, the changing point information can be transmitted to the server 3, and the load on the server 3 can be reduced without burdening the server 3 with the process of specifying the changing point information.

Further, the road information data is generated, and the generated road information data is transmitted to the server 3. Thereby, the segment image data and the road information data can be transmitted to the server 3 in association with each other. That is, the server 3 can manage the segment image data received from the vehicular image data generation device 2 and the road information data in association with each other, and by utilizing the road information data, the server 3 can add the additional valuable information to the traveling trajectory data for autonomous driving.

Although the present disclosure has been described in accordance with the examples, it is understood that the present disclosure is not limited to such examples or structures. The present disclosure covers various modification examples and equivalent arrangements. In addition, various combinations and configurations, as well as other combinations and configurations that include only one element, more, or less, fall within the scope and spirit of the present disclosure.

A process to remove unnecessary objects in segment image data, a process to recognize lane lines in segment image data, a process to identify lane centerlines in segment image data, a process to identify tentative positions of lane center lines, a process to specify absolute positions of lane center lines, a process for providing evaluation results to segment image data, and a process for specifying change point information are performed by the vehicular image data generation device 2. Alternatively, these processes may be performed by the server 3. That is, the configuration may be such that these processes are shared and performed by the vehicular image data generation device 2 and the server 3 as appropriate.

What is claimed is:

1. An image data generation device for a vehicle communicating with a server that recognizes an image in at least one of a basic map data, an aerial photograph data, and a navigation map data, recognizes an image data generated by an in-vehicle camera, and generates a travel trajectory data for autonomous driving, the image data generation device comprising:
    a segment image data generation unit that generates image data for each segment as a segment image data based on the image data generated by the in-vehicle camera; and
    a data transmission unit that transmits the segment image data generated by the segment image data generation unit to the server, wherein:
    the segment image data generation unit includes: an image data arranging unit that arranges a plurality of image data photographed in a chronological order by the in-vehicle camera according to coordinate points of an estimated trajectory of the vehicle;
    an image data coupling unit that couples the plurality of image data arranged by the image data arranging unit in accordance with a pavement paint marking on a road surface to generate coupled image data; and
    an image data dividing unit that divides the coupled image data generated by the image data coupling unit by each segment according to the pavement paint marking on the road surface or the navigation map data to generate the segment image data based on at least one of a gap in the pavement paint marking on the road surface, a node position in the navigation map data, and a change in a lane on the road surface;
    each of the plurality of image data is two-dimensional image data including a plurality of image elements;
    the segment image data is a part of the coupled image data indicative of one segment; and
    the segment image data includes the part of the coupled image data to align a road surface paint continuously.

2. An image data generation device for a vehicle communicating with a server that recognizes an image in at least one of a basic map data, an aerial photograph data, and a navigation map data, recognizes an image data generated by an in-vehicle camera, and generates a travel trajectory data for autonomous driving, the image data generation device comprising:

a segment image data generation unit that generates the image data for each segment as a segment image data based on the image data generated by the in-vehicle camera;

a data transmission unit that transmits the segment image data generated by the segment image data generation unit to the server;

a lane line recognition unit that recognizes a lane line in the segment image data generated by the segment image data generation unit;

a lane center line specifying unit that specifies a lane center line in the segment image data according to a recognition result of the lane line by the lane line recognition unit; and a tentative position specifying unit that compares at least one of a road centerline of the navigation map data and a traveling trajectory of the vehicle with a traveling direction of the vehicle to specify a tentative position of the lane center line in the segment image data, wherein:

when transmitting the segment image data to the server, the data transmission unit transmits a recognition result of the lane line in the segment image data recognized by the lane line recognition unit to the server; and the segment image data generation unit couples a plurality of image data in accordance with a pavement paint marking on a road surface to generate coupled image data and divides the coupled image data into a plurality of segments according to pavement paint markings on a road surface or navigation map data to generate the segment image data based on at least one of a gap in the pavement paint markings on the road surface, a node position in the navigation map data, and a change in a lane on the road surface;

each of the plurality of image data is two-dimensional image data including a plurality of image elements;

the segment image data is a part of the coupled image data indicative of one segment; and the segment image data includes the part of the coupled image data to align a road surface paint continuously.

3. The image data generation device for the vehicle according to claim 2, further comprising:

an absolute position specifying unit that compares the navigation map data with the recognition result of the lane line in the segment image data to specify an absolute position of the lane center line in the segment image data in which the tentative position is specified, wherein:

when transmitting the segment image data to the server, the data unit transmission unit transmits the absolute position of the lane center line in the segment image data specified by the absolute position specifying unit to the server.

4. An image data generation device for a vehicle communicating with a server that recognizes an image in at least one of a basic map data, an aerial photograph data, and a navigation map data, recognizes an image data generated by an in-vehicle camera, and generates a travel trajectory data for autonomous driving, the image data generation device comprising:

a segment image data generation unit that generates the image data for each segment as a segment image data based on the image data generated by the in-vehicle camera;

a data transmission unit that transmits the segment image data generated by the segment image data generation unit to the server;

an evaluation result assigning unit that assigns an evaluation result to the segment image data generated by the segment image data generation unit; and a segment image data storage unit that stores the segment image data generated by the segment image data generation unit, wherein:

the segment image data storage unit stores one of a plurality of segment image data in a same segment, to which a best evaluation result is assigned, and the best evaluation result assigned to the one of the plurality of segment image data by the evaluation result assigning unit, to connect the one of the plurality of segment image data with the best evaluation result;

when transmitting the segment image data to the server, the data transmission unit transmits the evaluation result stored in the segment image data storage unit in association with the segment image data to the server; and the segment image data generation unit couples a plurality of image data in accordance with a pavement paint marking on a road surface to generate coupled image data and divides the coupled image data into a plurality of segments according to pavement paint markings on a road surface or navigation map data to generate the segment image data based on at least one of a gap in the pavement paint markings on the road surface, a node position in the navigation map data, and a change in a lane on the road surface;

each of the plurality of image data is two-dimensional image data including a plurality of image elements;

the segment image data is a part of the coupled image data indicative of one segment; and the segment image data includes the part of the coupled image data to align a road surface paint continuously.

5. The image data generation device for the vehicle according to claim 1, further comprising:

an unnecessary object eliminating unit that adjusts a brightness of a shadow in the segment image data generated by the segment image data generation unit and eliminates an unnecessary object in the segment image data.

6. The image data generation device for the vehicle according to claim 1, further comprising:

a changing point information specifying unit that specifies, as changing point information, a changing point of the segment image data generated by the segment image data generation unit different from a previous segment image data of a same segment, wherein:

when transmitting the segment image data to the server, the data transmission unit transmits the changing point information specified by the changing point information specifying unit to the server.

7. The image data generation device for the vehicle according to claim 1, further comprising:

a road information data generation unit that generates a road information data from the image data generated by an in-vehicle camera, wherein:

when transmitting the segment image data to the server, the data transmission unit transmits the road information data generated by the road information data generation unit to the server.

8. A travelling trajectory data generation system comprising:

an image data generation device for a vehicle according to claim 1; and a server that recognizes an image of at least one of the basic map data, the aerial photograph data, and the navigation map data, recognizes an image of the image data generated by the in-vehicle camera, and generates a travelling trajectory data for autonomous driving.

9. The image data generation device for the vehicle according to claim 1, further comprising:
one or more processors; and
a memory coupled to the one or more processors and storing program instructions that when executed by the one or more processors cause the one or more processors to provide at least: the segment image data generation unit; and the data transmission unit.

10. The image data generation device for the vehicle according to claim 2, further comprising:
one or more processors; and
a memory coupled to the one or more processors and storing program instructions that when executed by the one or more processors cause the one or more processors to provide at least: the segment image data generation unit; the data transmission unit; the lane line recognition unit; the lane center line specifying unit; and the tentative position specifying unit.

11. The image data generation device for the vehicle according to claim 4, further comprising:
one or more processors; and
a memory coupled to the one or more processors and storing program instructions that when executed by the one or more processors cause the one or more processors to provide at least: the segment image data generation unit; the data transmission unit; the evaluation result assigning unit; and the segment image data storage unit.

12. A non-transitory tangible computer readable medium comprising instructions being executed by a computer, the instructions including a computer-implemented method for an image data generation device for a vehicle, which communicates with a server that recognizes an image in at least one of a basic map data, an aerial photograph data, and a navigation map data, recognizes an image data generated by an in-vehicle camera, and generates a travel trajectory data for autonomous driving, the instructions comprising:
generating an image data for each segment as a segment image data based on the image data generated by the in-vehicle camera; and
transmitting the segment image data generated in the generating of the segment image data to the server, wherein:
the generating of the segment image data includes:
arranging a plurality of image data photographed in a chronological order by the in-vehicle camera according to coordinate points of an estimated trajectory of the vehicle;
coupling the plurality of image data arranged by the arranging of the image data in accordance with a pavement paint marking on a road surface to generate a coupled image data; and
dividing the coupled image data generated by the coupling of the image data by each segment according to the pavement paint marking on the road surface or the navigation map data to generate the segment image data based on at least one of a gap in the pavement paint marking on the road surface, a node position in the navigation map data, and a change in a lane on the road surface;

each of the plurality of image data is two-dimensional image data including a plurality of image elements;
the segment image data is a part of the coupled image data indicative of one segment; and
the segment image data includes the part of the coupled image data to align a road surface paint continuously.

13. A non-transitory tangible computer readable medium comprising instructions being executed by a computer, the instructions including a computer-implemented method for an image data generation device for a vehicle, which communicates with a server that recognizes an image in at least one of a basic map data, an aerial photograph data, and a navigation map data, recognizes an image data generated by an in-vehicle camera, and generates a travel trajectory data for autonomous driving, the instructions comprising:
generating an image data for each segment as a segment image data based on the image data generated by the in-vehicle camera;
coupling a plurality of image data in accordance with a pavement paint marking on a road surface to generate coupled image data;
dividing the coupled image data into a plurality of segments according to pavement paint markings on a road surface or navigation map data to generate the segment image data based on at least one of a gap in the pavement paint markings on the road surface, a node position in the navigation map data, and a change in a lane on the road surface;
each of the plurality of image data is two-dimensional image data including a plurality of image elements;
the segment image data is a part of the coupled image data indicative of one segment; and
the segment image data includes the part of the coupled image data to align a road surface paint continuously;
transmitting the segment image data generated in the generating of the segment image data to the server;
recognizing a lane line in the segment image data generated by the generating of the segment image data;
specifying a lane center line in the segment image data according to a recognition result of the lane line by the recognizing of the lane line; and
comparing at least one of a road centerline of the navigation map data and a traveling trajectory of the vehicle with a traveling direction of the vehicle to specify a tentative position of the lane center line in the segment image data, wherein:
when transmitting the segment image data to the server, the transmitting of the segment image data further includes: transmitting a recognition result of the lane line in the segment image data recognized by the recognizing of the lane line to the server.

14. A non-transitory tangible computer readable medium comprising instructions being executed by a computer, the instructions including a computer-implemented method for an image data generation device for a vehicle, which communicates with a server that recognizes an image in at least one of a basic map data, an aerial photograph data, and a navigation map data, recognizes an image data generated by an in-vehicle camera, and generates a travel trajectory data for autonomous driving, the instructions comprising:
generating an image data for each segment as a segment image data based on the image data generated by the in-vehicle camera;
coupling a plurality of image data in accordance with a pavement paint marking on a road surface to generate coupled image data;

dividing the coupled image data into a plurality of segments according to pavement paint markings on a road surface or navigation map data to generate the segment image data based on at least one of a cap in the pavement paint markings on the road surface, a node position in the navigation map data, and a change in a lane on the road surface;

each of the plurality of image data is two-dimensional image data including a plurality of image elements;

the segment image data is a part of the coupled image data indicative of one segment; and the segment image data includes the part of the coupled image data to align a road surface paint continuously;

transmitting the segment image data generated in the generating of the segment image data to the server;

assigning an evaluation result to the segment image data generated by the generating of the segment image data;

storing the segment image data generated by the generating of the segment image data, wherein:

the storing of the segment image data further includes: storing one of a plurality of segment image data in a same segment, to which a best evaluation result is assigned, and the best evaluation result assigned to the one of the plurality of segment image data by the assigning of the evaluation result, to connect the one of the plurality of segment image data with the best evaluation result; and when transmitting the segment image data to the server, the transmitting of the segment image data further includes: transmitting the evaluation result stored in the storing of the segment image data in association with the segment image data to the server.

* * * * *